(12) United States Patent
Sahinoglu et al.

(10) Patent No.: US 8,493,026 B2
(45) Date of Patent: Jul. 23, 2013

(54) SYSTEM AND METHOD FOR AD-HOC ENERGY EXCHANGE NETWORK

(75) Inventors: Zafer Sahinoglu, Boston, MA (US); Zhifeng Tao, New York, NY (US); Koon Hoo Teo, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 359 days.

(21) Appl. No.: 13/025,974

(22) Filed: Feb. 11, 2011

(65) Prior Publication Data

US 2012/0041804 A1 Feb. 16, 2012

Related U.S. Application Data

(60) Provisional application No. 61/366,380, filed on Jul. 21, 2010.

(51) Int. Cl.
*H02J 7/00* (2006.01)
(52) U.S. Cl.
USPC .......................................... 320/109
(58) Field of Classification Search
USPC .......................................... 320/109
See application file for complete search history.

(56) References Cited

U.S. PATENT DOCUMENTS

| | | | |
|---|---|---|---|
| 6,067,008 A * | 5/2000 | Smith | 340/438 |
| 6,792,259 B1 * | 9/2004 | Parise | 455/343.1 |
| 8,364,388 B2 * | 1/2013 | Naito et al. | 701/533 |
| 2008/0272734 A1 * | 11/2008 | Ren | 320/109 |
| 2009/0313098 A1 * | 12/2009 | Hafner et al. | 705/14.1 |
| 2010/0094496 A1 * | 4/2010 | Hershkovitz et al. | 701/22 |
| 2010/0141203 A1 * | 6/2010 | Graziano et al. | 320/109 |
| 2011/0018679 A1 * | 1/2011 | Davis et al. | 340/3.1 |
| 2011/0184842 A1 * | 7/2011 | Melen | 705/34 |

* cited by examiner

*Primary Examiner* — Arun Williams
(74) *Attorney, Agent, or Firm* — Dirk Brinkman; Gene Vinokur

(57) ABSTRACT

A method for facilitating an operation of an ad-hoc energy exchange network is disclosed. The network includes a set of nomadic charging stations (NCSs) and an energy consumer (EC). Upon receiving a request from the EC for an energy exchange, wherein the request includes a current location and a destination location of the EC, an exchange location for performing the energy exchange between a nomadic charging station (NCS) and the EC is determined based on the current location of the EC, the destination location of the EC, and a current location of the NCS. The exchange location is transmitted to the NCS and the EC.

16 Claims, 9 Drawing Sheets

100

SYSTEM AND METHOD FOR AD-HOC ENERGY EXCHANGE NETWORK

RELATED APPLICATION

This Non-Provisional Application claims priority to U.S. Provisional Application 61/366,380, "System and Method for Facilitating Energy Exchange Between Energy Suppliers and Energy Consumers" filed by Sahinoglu et al., on Jul. 18, 2010, and incorporated herein by reference.

FIELD OF THE INVENTION

This invention relates generally to energy exchange, and more particularly to facilitating energy exchange between energy suppliers and energy consumers.

BACKGROUND OF THE INVENTION

The use of electric vehicles (EVs) is an economically viable alternative to vehicles equipped with internal combustion engines. The government of the United States of America has proposed a goal for vehicle manufactures to produce one million EVs by 2015. The widespread use of EVs will need to be supported by government policy and regulations and an appropriate infrastructure, such as battery charging station at home, at work and in and around roadways. The infrastructure and appropriate methodology for charging batteries in EVs are vital for the success and long-term viability of the electric vehicle industry.

There is a growing trend to install charging stations with an infrastructure similar to conventional gasoline stations. However, there are number of problems associated with such charging stations. For example, to provide sufficient supply for electricity demand from the power grid during peak-hours, a utility company may need to activate additional generators. Therefore, charging EVs during daytime from an already highly utilized power grid puts an additional burden on the power grid.

Moreover, when there is a large electricity demand in a particular area due to weather conditions and events drawing a large number of vehicles, insufficient power capacity can localized power failures. Hence, satisfying the charging needs of EVs may not be easy, or practically possible.

Accordingly, there is a need for alternative solution for energy exchange between energy suppliers and energy consumers.

SUMMARY OF THE INVENTION

Conventional charging stations are stationary because of their bulk, weight and a permanent connection to an energy source such as a power grid or a fuel reservoir. This is not perceived as a problem, but rather as a fact of life. However, there are number of problems inherent in an infrastructure with stationary charging stations.

For example, minimizing electricity usage from the power grid during peak-hours is a fundamental problem of the stationary charging station. Another problem of the stationary charging stations is inherent in the predetermined, locations of the stations. This is because the locations cannot be changed in response to consumer demand, which can in turn depend, e.g., on season, time of the day, traffic and weather conditions. Also, the stationary charging stations cannot accommodate an energy consumer that does not have enough energy to reach the stationary charging station, even if the consumer agreed to pay premium price for delivery of the energy.

Embodiments of the invention are based on a realization that making charging stations nomadic solves the above problems and provides numerous benefits and advantages. As defined herein, a nomadic charging station is a charging station that can relocate to meet local demands for energy.

For example, the nomadic charging station can be recharged by the stationary charging station during off-hours and relocated to a service location for energy exchange with the energy consumers during the peak-hours. The nomadic charging station can be relocated in response to local energy demands. In addition, the nomadic charge stations can accommodate vehicles with limited energy levels and/or negotiate a price for the energy exchange.

Some embodiments of the invention describe an operation and a structure of an energy distribution network. In various embodiments, the network includes an operation center for managing nomadic charging stations to bring energy to the energy consumers, such that energy transaction becomes beneficial to both the energy suppliers and the energy consumers, and also to the power grid operator. In one embodiment, the operation center manages distribution, charging and replacement of energy units for the nomadic charging stations.

Other embodiments of the invention describe energy suppliers, e.g., the nomadic charging station, and energy consumers, e.g., electric vehicles (EVs), employing principles of invention. For example, by employing principles of this invention, energy consumers do not need to rely on the stationary charging stations. The energy consumers can obtain energy from the nomadic charging stations and from other electric vehicles that are willing to sell the energy. Thus, local energy exchanges with the energy consumers do not overload the power grid. The invention also enables consumers to participate in energy exchanges as a business, or for the investment purposes. For example, any party that owns an energy unit, such as a battery, can exchange energy for a profit.

Some embodiments provide means for dynamic energy pricing, such that the energy supplier and the energy consumer can negotiate incentives and meeting locations to perform the energy transaction to protect their respective interests, given certain constraints such as driving distance, service time, service length, and service location.

The nomadic charging stations can include portable and mobile charging stations. The portable charging station can be relocated, but are not mobile. The portable charging station can utilize energy storage systems, such as premium power storages offered by the Premium Power Corporation, North Reading, Mass. USA. The mobile charging stations are able to move on and off roads. An example of the mobile charging station is the electrical vehicle itself, e.g., a high energy capacity EVs.

DESCRIPTION OF THE EMBODIMENT

Overview of Energy Exchange Ad-Hoc Network

Figure 1:
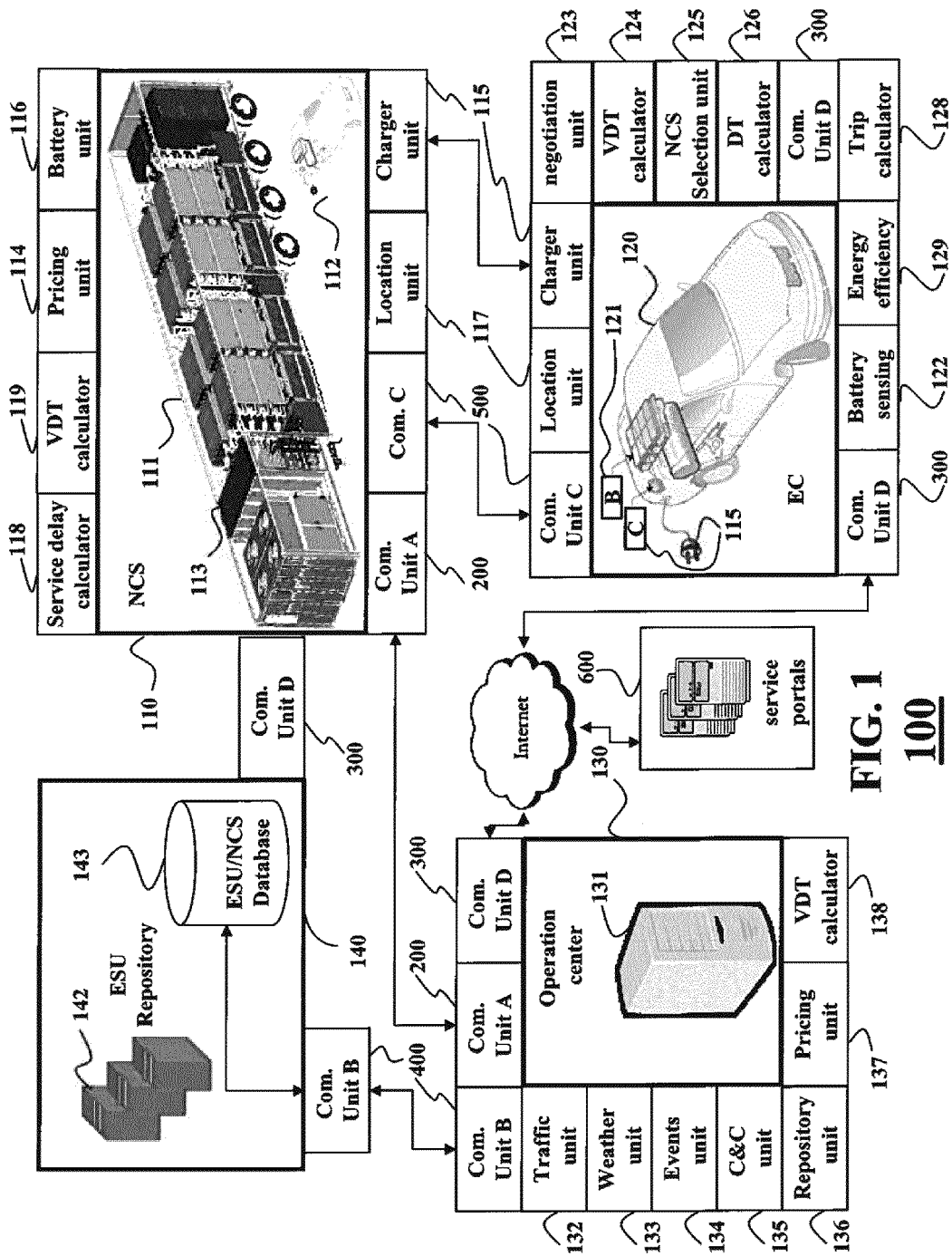
FIG. 1 is a block diagram of an ad-hoc energy exchange network according to embodiments of the invention.

FIG. 1 shows an ad-hoc energy exchange network 100 according to embodiments of the invention. The network can include energy suppliers such as nomadic charging stations (NCS) 110 for facilitating energy exchange with energy consumers (EC) 120. An example of the energy consumer is an electric vehicle (EV). In one embodiment, the network 100 includes an operation center 130. In some embodiments, the network also includes a repository 140 of energy units. The NCS can be portable 111 and/or mobile 112. An example of the portable NCS is a collection of energy units arranged on a movable platform so that the energy units can be relocated from one place to another. An example of the mobile NCS is an EV with a high energy capacity. The operation center is implemented, in part, using a computer system 131, which can include a processor, a memory and input/output interfaces as known in the art.

The embodiments enable the energy suppliers to bring energy to the energy consumers, such that energy exchange becomes economically beneficial to both the energy suppliers and the energy consumers, and also to a power grid operator. The ad-hoc energy exchange network enables the energy consumers and the energy suppliers to join or leave the network based on their energy needs or energy exchange capabilities. In various embodiments, the energy supplier or the energy consumer can operate as the operation center or the energy consumer.

Operation Center

In some embodiments, the ad-hoc energy exchange network includes the operation center for facilitating information and energy exchange between the energy suppliers and the energy consumers. In various embodiments, the operation center includes one or combination of a communication unit A 200 to exchange information with the energy suppliers, a communication unit D 300 to exchange information with the energy consumers. In one embodiment, the operations center also includes a communication unit B 400 to exchange information with the repository of the energy units.

In various embodiments, the operation center includes a combination of information retrieval and processing units, such as a traffic unit 132, a weather unit 133, an events unit 134, a control and command (C&C) unit 135, a repository unit 136, a pricing unit 137 and a virtual distance tolerance (VDT) calculator 138.

The traffic unit, the weather unit, and the events unit are responsible for connecting to corresponding communication interfaces and collecting information on traffic conditions in the service area, weather condition, ongoing, and schedules of upcoming events, respectively.

In some embodiments, the pricing unit determines a price of a unit energy, e.g., as a function of time, based on the reports from the energy suppliers or the energy consumers arranged in a service area, the traffic, the weather conditions and the events. Then, the price is communicated to the energy suppliers and/or to the energy consumers. The operating center can also include a billing unit (not shown) that handles billing for the energy transactions.

Additionally or alternatively, in some embodiments, the operations center determines an exchange location for the energy exchange between the energy supplier and the energy consumer based on, e.g., the information about the traffic, the weather, and the events. In one variation of this embodiment, the operation center determines the price of the energy unit based on the location of the energy suppliers or the energy consumers.

Nomadic Charging Station

In some embodiments, the ad-hoc energy exchange network includes the nomadic charging station (NCS) as the energy suppliers. The NCSs can be portable or mobile. The portable NCS includes energy units (EU) 113, which can be unloaded charged to serve energy consumers at desired locations of energy exchange. The empty energy units are picked up and delivered to the EU repository 142 for charging. Additionally or alternatively, the portable NCS can move or be moved to, e.g., a location of the EU repository, for service and recharging of the EU. The mobile NCS includes one or more batteries, such as a battery 121 with a high capacity.

The NCS can provide energy to the energy consumers, e.g., the electrical vehicles, which need to be charged to reach destinations. This novel concept of the network of the NCSs brings about the following advantages. The energy consumers do not require access to the power grid. Thus, during peak hours, load demand from the grid is reduced by directing the electrical consumers towards the NCSs. Portability of NCSs is used to optimize placement of NCSs. Thus, the cost of energy can be reduced. NCSs can be replaced when they are out of energy and can be moved to different meeting locations as needed.

In various embodiments, the NCS can further include one or combination of a communication unit C 500 to exchange data with the energy consumers, a NCS energy price negotiation unit 114, charger unit(s) 115 configured for the energy exchange, a battery condition sensing unit 116, a location finder unit 117, a service delay calculator unit 118, a virtual distance tolerance calculator unit 119, and the communication unit A 200 to exchange data with the operation center. The communication unit C transfers data using a general packet radio service (GPRS) connection, Worldwide Interoperability for Microwave Access (WiMax), or any other available data communication technology.

In one embodiment, the energy price negotiation unit receives the price of the unit of energy from the pricing unit. In some embodiments, the energy price negotiation unit determines the price of the unit energy based on, e.g., the amount of energy the energy consumer buys, the distance that the NCS needs to move to sell the energy, the distance that the energy consumer needs to move to buy energy, the time expected by the NCS to wait for the consumer to arrive at the energy exchange location, and the probability of meeting other potential consumers at the energy exchange location.

The battery condition sensing unit monitors a level of the energy and operational condition of the batteries and/or energy units carried by the NCS. Thus, there is an accurate measure of how much energy is available at a given time.

The location finder unit determines the coordinates of the location of the NCS. The coordinates are used to determine distances to the energy consumer, incentives to be offered to the energy consumer, and the energy price. The NCS location finder unit can use a global positioning system (GPS) to determine current and/or the exchange location.

The service delay calculator unit determines a delay experienced by the energy consumer before commencement of the energy exchange. Arriving at a NCS location does not necessarily guarantee immediate energy availability for the consumer. In some embodiments, the NCS informs the energy consumers of any delays.

In some situations, the energy consumer cannot move to the NCS, but the NCS can move to the consumer. However, there is a limitation on how far a NCS can move to the consumer. This limitation is defined as a physical distance tolerance (PDT). The PDT is due to the energy required to move the NCS. For example, if the NCS has the energy to move ten miles, then the PDT is not more than ten miles. The PDT can vary depending on vehicle velocity, acceleration and local topology.

Each NCS includes one or more charging units, which are used to transfer energy between the NCS and the energy consumers. Some electric vehicles can sell energy to NCS. Therefore, in some embodiments, the charging unit interface supports bidirectional energy transfers.

Usually, the NCS is assigned a unique identification number (ID), and equipped with sensors to measure the remaining energy level, internal and external temperatures of the battery. Even though the operation center (OC) can determine and record the global location coordinates of NCSs, each NCS also includes a GPS to detect any authorized or unauthorized movement. In some embodiments, the NCSs include bidirectional communication modules for communication with the operating center. Additionally or alternatively, the NCS can duplicate some functionality of the operation center for servicing the energy consumers independently.

Energy Consumers

The energy consumer (EC), such as the electric vehicle, includes an energy storage unit, such as a battery 121, a charger unit 115 for the energy exchange, the communication unit C 500 to communicate with the NCS and other energy suppliers, the location finder unit 117, an energy price negotiation unit 123, a virtual distance tolerance calculator unit 124, a NCS selection unit 125, a delay tolerance calculator unit 126, a trip calculator unit 128, an energy efficiency unit 129, a battery condition sensing unit 122, and a communication unit D 300 to exchange data with the operation center over e.g., Internet, using any other available data communication technology.

The energy price negotiation unit of the electric vehicle negotiates the energy price based on the required amount of the energy, the distance that the energy consumer needs to move to buy energy, the probability of meeting other potential energy providers at nearby locations.

As the distance to the destination decreases, the electric vehicle becomes reluctant to travel long distances to purchase energy. This distance constraint is defined for the electric vehicle as the virtual distance tolerance (VDT). If the EC i deviates for a certain distance from an original route to perform a critical task, such as recharging the battery, then a maximum possible deviation from the route at a given time t is the VDT, and denoted by $T_v^{(i)}(t)$. Larger deviations are usually more likely at an earlier stage of a longer trip. During shorter trips, deviations typically are less than those during longer trips. According to one embodiment, a model for $T_v^{(i)}(t)$ is $$T_v^{(i)}(t) = \max(0, e^{-\lambda_i t}(r_{AB} - v_i(t)t). \tag{1}$$

where $\lambda_i$ represents a deviation decay constant to determine the VDT circles, $r_{AB}$ is a travel distance between a current location A of the EC and a destination location B, $v_i$ is an average speed of the EC i.

The location finder unit determines the location of the EC. The location is used to determine distance to the NCSs, and/or incentives to negotiate with the energy suppliers. The location finder unit can use the GPS to determine the location of the EC.

The battery condition sensing unit monitors the energy level and operational conditions of the battery of the EC. Thus, there is an accurate measure of how much energy is needed at a given time, and whether the available energy is sufficient for remainder of the trip.

In some embodiments, the EV battery condition sensing unit monitors battery temperature, remaining energy level, and current energy demand and energy consumption rate. These values are communicated to the NCSs, or to the operation center (OC), either periodically or when polled by the OC. In some embodiments, the EC transmits the data to the OC using the communication unit D that can use cellular infrastructure, GPRS or Wimax. Alternatively, the NCSs can relay the EC data to the OC.

In one embodiment, the EC is equipped with a unit that determines the delay tolerance (DT) of the EC in reaching the destination. If a particular NCS offers a charging service with a delay that is longer than the delay tolerance of the EC, then the delay tolerance unit can inform the NCS selection unit of the EC to locate an alternative NCS. Typically, the delay tolerance of the EC can be set and/or modified by a user of the EC.

There can be multiple NCSs near the EV to provide the charging service. In this case, the NCS selection unit selects the NCS to interact with. This decision depends on distance between each NCS and the EC, the unit energy price each NCS is offering, the cost of the energy purchase from each NCS including the movement cost of the EC to each NCS, the service time, the waiting time at the NCS, the delay tolerance, the VDT and the PDT of the EC, and an energy efficiency constraint of the EC.

The trip calculator unit of the EV is configured for determining the energy required for the remaining trip based on the destination coordinates, the current location of the EC and the expected average speed of the EC based on weather and traffic conditions.

The energy inefficiency of the EC i is defined as the energy consumption overhead due to a deviation from an original route towards a destination of the EC. The energy inefficiency is upper bounded by $2T^{(i)}_v(T_0)/r_{AB}$, where $T_0$ is a time instant the deviation takes place. The factor of 2 is because of a round-trip deviation. In the case that the EC is cannot move to the NCS, e.g., due to the PDT or the VDT constraint, the NCS can move to the EC. Minimizing the delay minimizes energy outages, because the feasible location of the EV determined by the VDT and PDT decreases in time. This introduces another factor called an energy supplier virtual distance tolerance (ESVDT). The ESVDT indicates how far the energy supplier is willing to move from its current location to charge the EC.

Energy Unit Repository

In one embodiment, the operations center is operatively connected to the energy storage unit (ESU) repository. The ESU repository is configured to store, recharge and/or service the energy storage units 142. An example of the ESU is a battery. The ESU repository can include an ESU/NCS database 143 for tracking operations of the ESUs.

Communication Unit A

Figure 2:
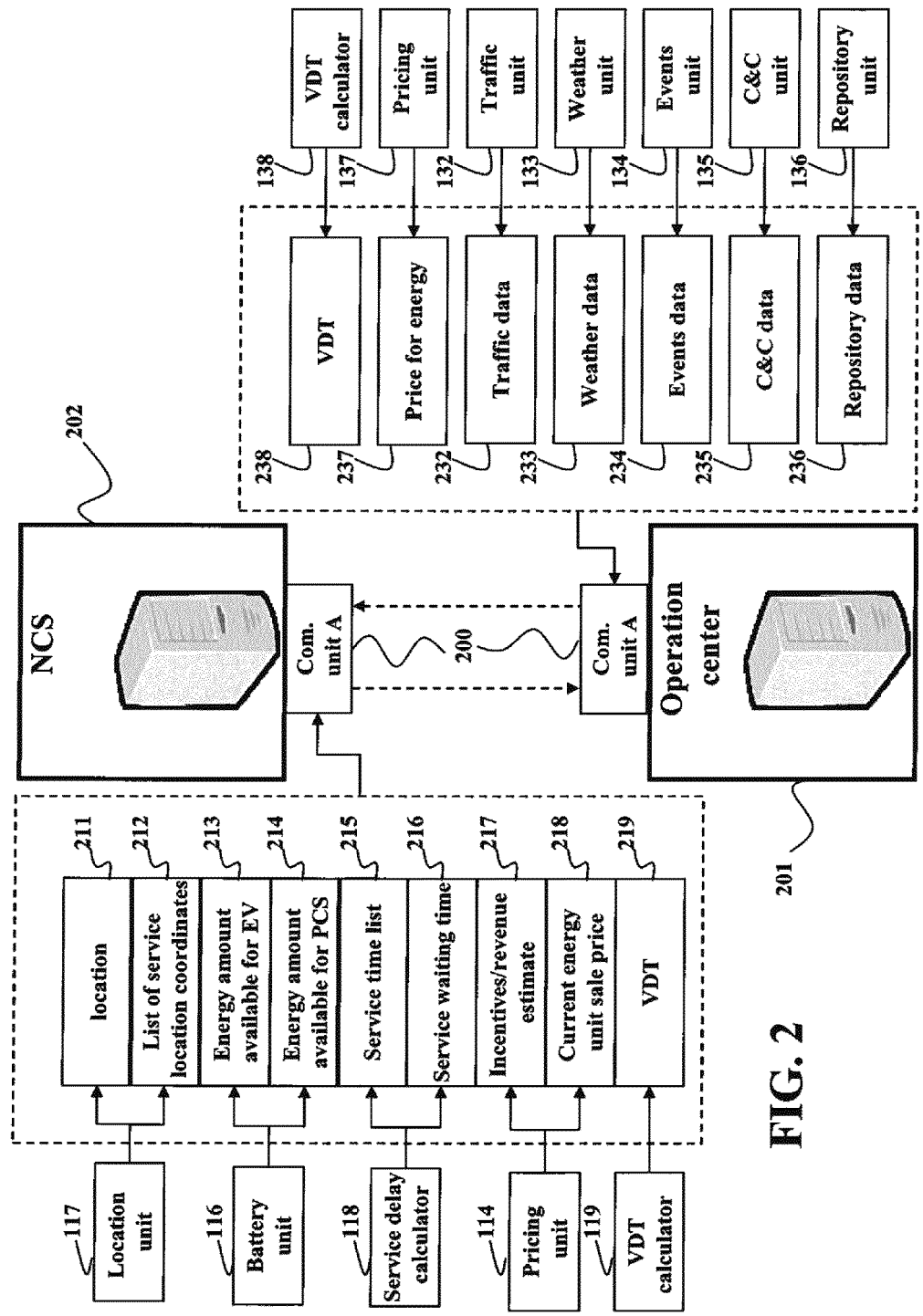
FIG. 2 is a block diagram of information exchanges between an energy supplier and an operation center according to embodiments of the invention.

FIG. 2 shows a the information exchanges between a processor 201 of the operation center and a processor 202 of the NCSs using the communication unit A. Depending on the energy demand distribution in a given service area an a certain time period, the NCSs need to be relocated. In some embodiments, the operation center determines the optimum relocation coordinates of the NCSs and then informing the NCSs of these new coordinates with corresponding NCS identifications.

The operation center can transmit to the NCSs one or combination of the following information: virtual distance tolerance for each for NCS 238 obtained from the VDT calculator 135, suggested energy sale price 237 obtained from the energy price negotiation unit 137, traffic data 232 obtained from the traffic unit 132, weather data 233 obtained from the weather unit 133, events data 234 obtained from the events unit 134, and control and command (C&C) data 235 obtained from the C&C unit 135. The C&C data can include the location for the energy exchange, the price for the unit of energy, identification data (ID) of the energy consumer (not shown), or combination thereof. Repository data 236 obtained from the repository unit 136.

Each NCS can transmit to the operation center one or combination of the following information: NCS ID (not shown), NCS location coordinates 211 and the list of service location coordinates 212 obtained from the NCS location unit 117, the energy 213 available for selling to ECs, and the energy 214 available for the NCS itself, e.g., fuel level. The energy 214 determines the PDT of the NCS. This information can be provided by the NCS battery condition sensing unit 116.

The NCS can also transmit a service time list 215 describing predetermined locations and the times the NCS offers charging services to the ECs. Additionally, the NCS can transmit service waiting time 216 determined by the service delay calculator unit 118. The service waiting time can describe waiting period for next EC to be served, energy exchange time for each or current EC.

The NCS can also transmit incentives and revenue estimate 217, and a energy unit sale price 218. This information is determined by the energy price negotiation unit 114 of the NCS. The NCS can also transmit the VDT 219 of the NCS, the ID of the EC to be served and maintenance information.

Communication Unit C

Figure 3:
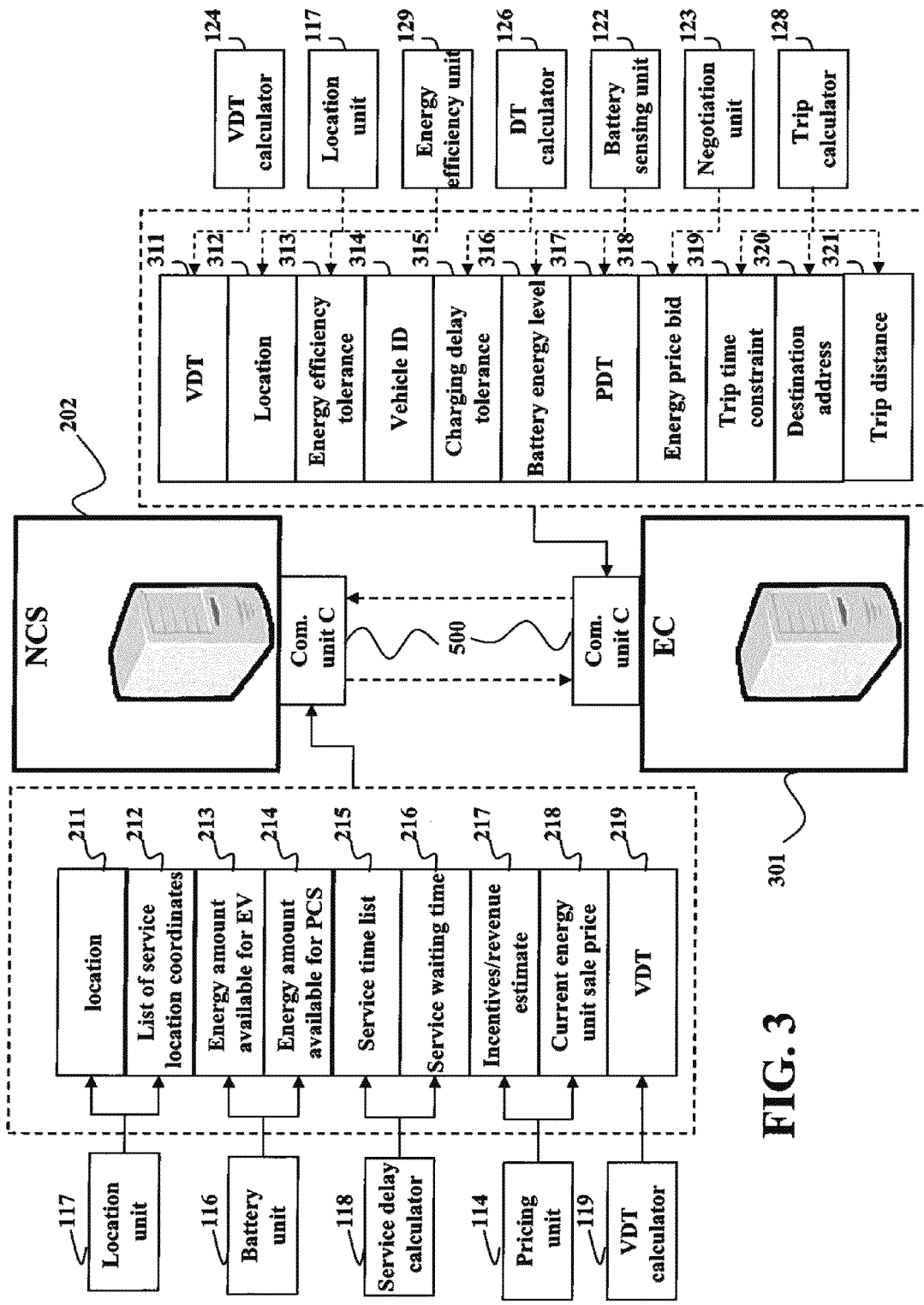
FIG. 3 is a block diagram of information exchanges between the energy supplier and an energy consumer according to embodiments of the invention.

FIG. 3 shows the information exchanges between a processor 301 of the energy consumer and the processor 202 of the NCSs using the communication unit C. Depending on the energy demand distribution in a given service area within a certain time period, the NCSs can move to meet energy demands of the energy consumer. In some embodiments, the operation center determines terms of the energy exchange, e.g., the service location and the price of the unit of energy. In other embodiments, the NCS negotiate the terms of the energy exchange with the energy consumer independently from the operation center. In other embodiments, the NCS join the network 100 dynamically and inform the operation center and energy consumers about its availability, readiness for the energy exchange, and other information facilitating energy exchange, e.g., a current location of the NCS.

In various embodiments, the NCS can transmit one or combination of the following information to the energy consumer: NCS ID (not shown), NCS location coordinates 211, one or several service locations, the price of the unit of energy associated with a particular service location, and amount of the energy available for sale. The NCS can also transmit the service time and the service waiting time for each service location.

The energy consumer transmits a request for the energy exchange with the energy supplier. In various embodiments, the request includes one or combination of the following information: a current location of the energy consumer 312 determined by the location unit 117, a destination location or address 320 determined by the trip calculator 128. The request can also include a trip distance 321 and a trip time constrains 319 determined by the trip calculator. The request can also include the ID of the energy consumer 314, and the VDT of the energy consumer determined by the VDT calculator 124.

The request can also include an energy efficiency tolerance 313 determined by the energy efficiency unit 129, a charging delay tolerance determined by the DT calculator unit 126 that indicates the tolerated waiting time before the energy is received by the energy consumer, and a battery energy level 316 and physical distance tolerance 317 of the energy consumer. The request can also include an energy price bid 318 determined by the negotiation unit 123. The energy price bid can optionally include a price for the unit of energy.

Communication Unit D

Figure 4:
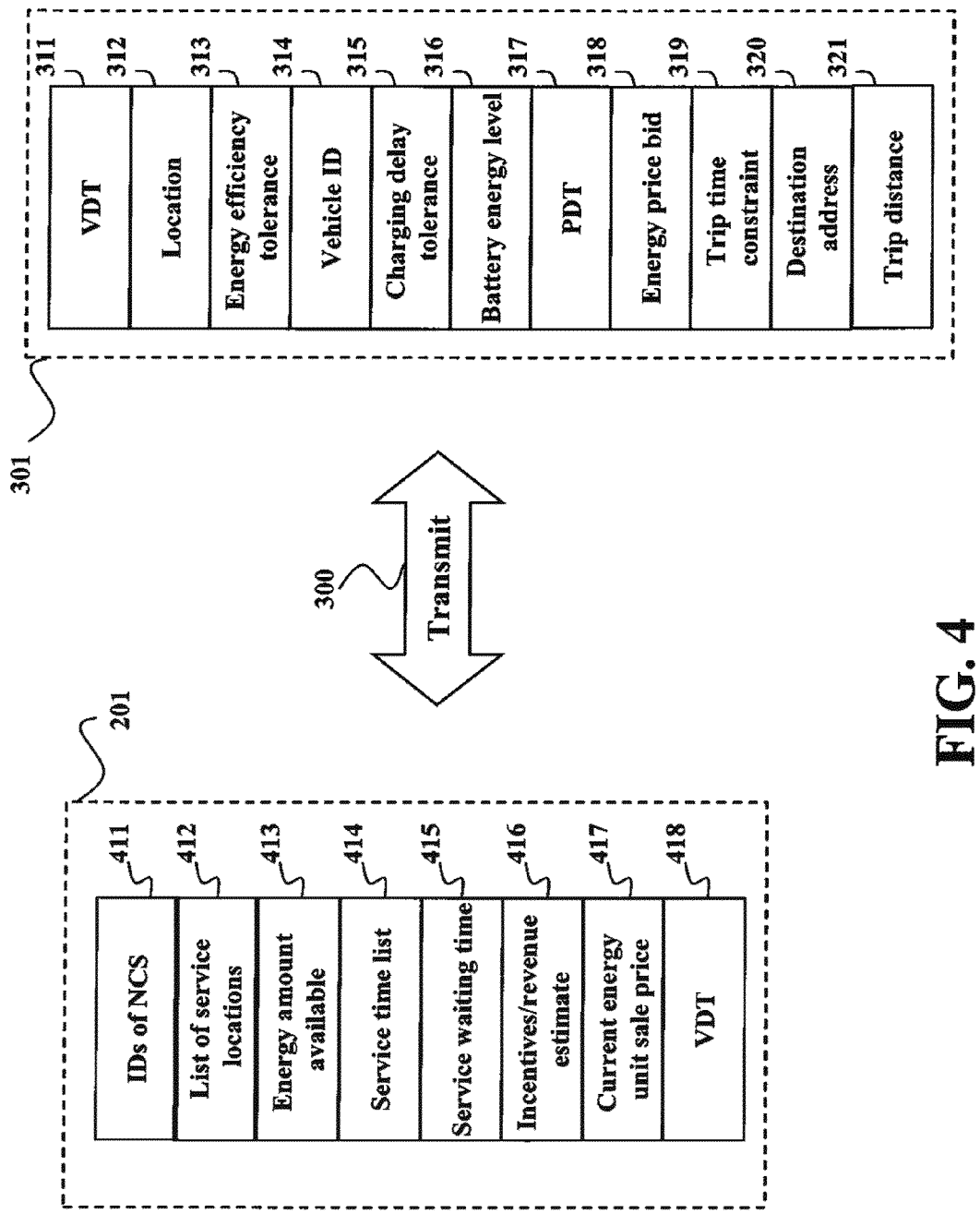
FIG. 4 is a block diagram of information exchanges between the energy consumer and the operation center according to embodiments of the invention.

FIG. 4 shows information exchanges between a processor 301 of the energy consumer and the processor 201 of the operation center using the communication unit D. Typically, the communication unit D is used by embodiment, wherein the operation center determines terms of the energy exchange, and wherein the energy suppliers is the NCS.

The operation center transmits the following information to the energy consumer: IDs 411 of the NCSs that can serve the energy consumer, and list of the service locations 412. The list of the service locations can include current locations of the NCSs and the locations wherein the NCSs have to relocate for the energy exchange, an available energy amount 413 that can be sold to the energy consumer, the service time 414, and the service waiting time 415 for each service location. The operation center can also transmit the price incentives 416, the energy unit sale price 417, and VDTs of the NCSs, The EV can also transmit information similar to the information transmitted to the NCS described above to the operation center.

Communication Unit B

Figure 5:
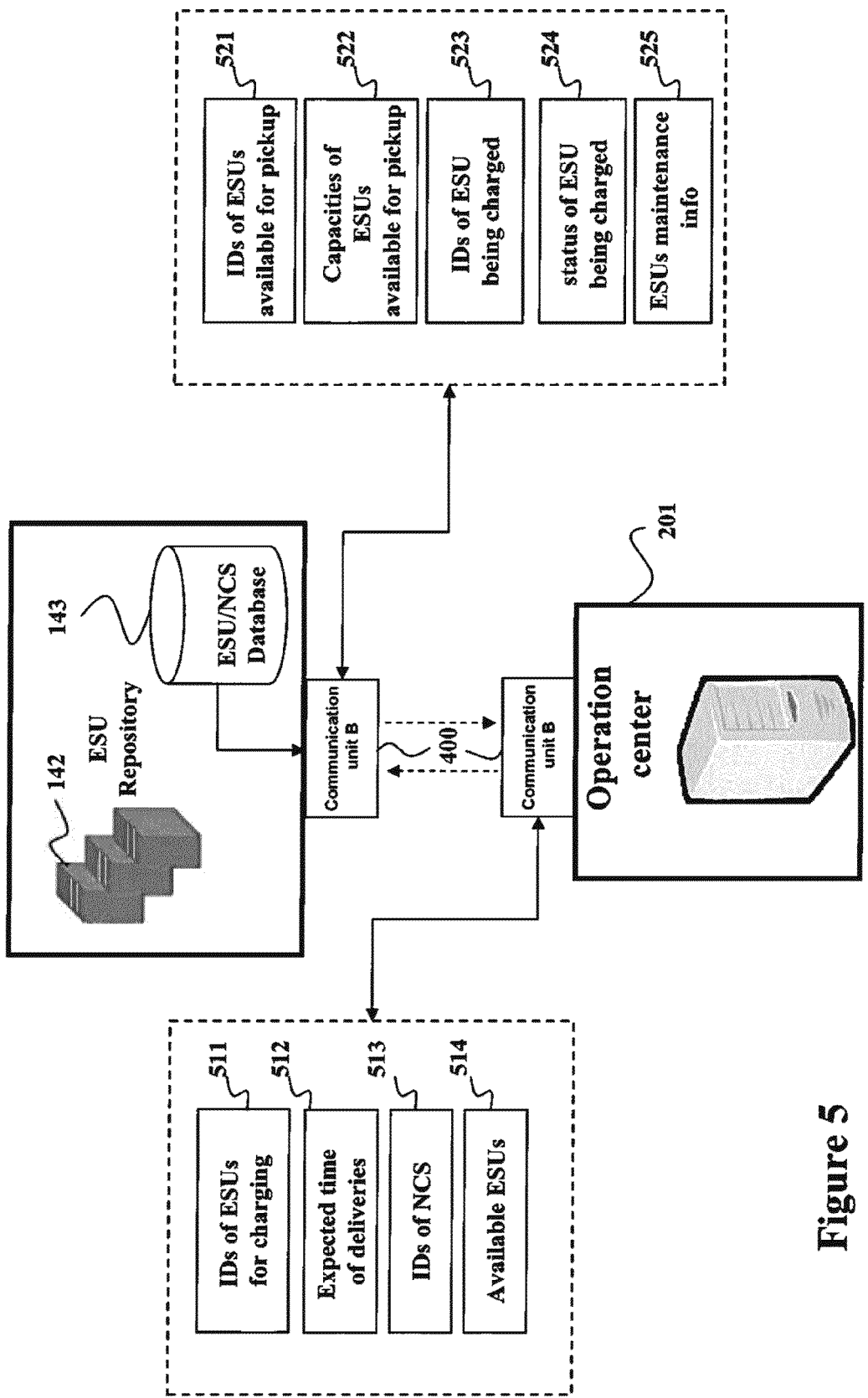
FIG. 5 is a block diagram of information exchanges between the energy supplier and a repository unit according to embodiments of the invention.

In one embodiment, the operations center is connected to the repository using the communication unit B 400 as shown in FIG. 5. According to some embodiments, the energy storage units on the NCS are delivered to the repository for recharging. Similarly, the recharged storage units are picked up by the NCSs.

As an example, the operation center can transmit to the NCS repository the following information: IDs of en energy storage units (ESUs) 511, e.g., batteries, to be delivered for charging at the repository, expected arrival time 512 of the USUs for recharging, IDs of the NCSs expected to deliver empty ESUs or to be recharged, and a number and IDs of ESUs 514 to be available for pickup.

The repository can transmit the following information to the operation center or to the energy suppliers: IDs of the energy storage units 521 available for pickup, capacity of each of the energy storage unit 522 available for pickup; IDs 523 of the energy storage units being charged, status 524 of the storage units being charged such as charge level, time to fully charged, time to be available for pickup or swapping; and general maintenance info 525 for each storage unit.

Service Portals

In various embodiments, one or several components of the ad-hoc energy exchange network, e.g., the operation center, energy supplier, the energy consumer, and repository, can be connected to service portals for receiving information facilitating energy exchanges.

Figure 6:
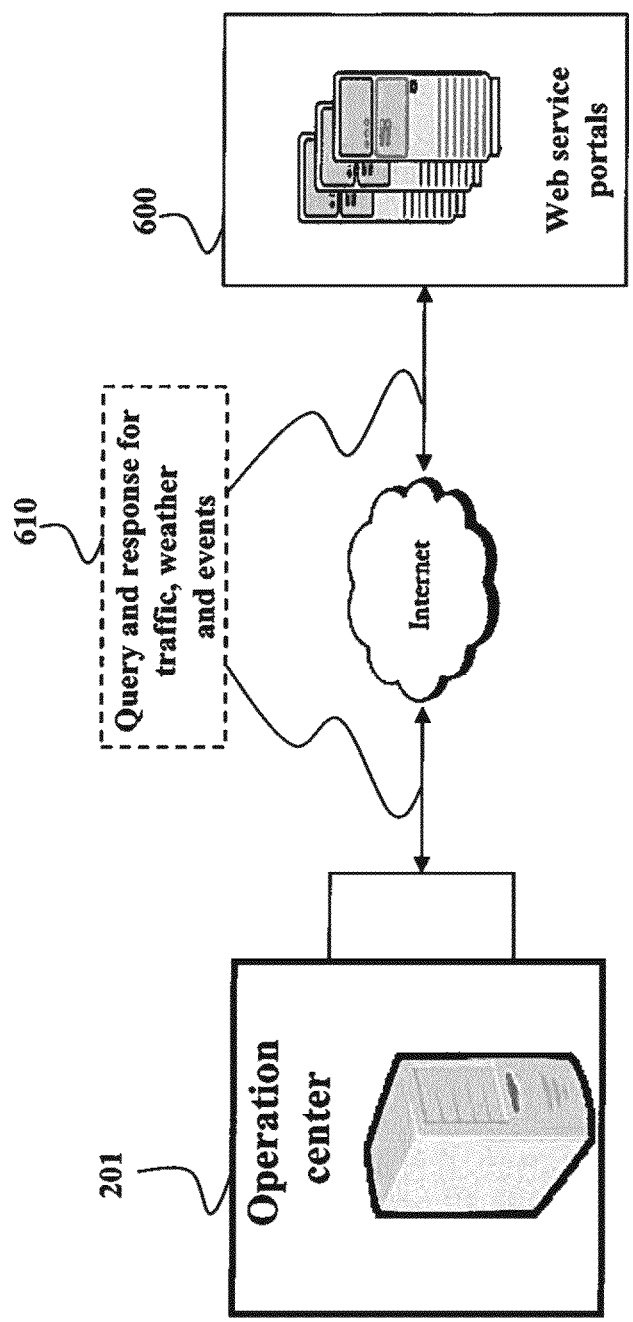
FIG. 6 is a block diagram of information exchanges between a service portal and the operations center according to embodiments of the invention.

FIG. 6 shows an example of an embodiment wherein the operation center is connected to service portals 600, e.g., web service portals, for querying and receiving 610 the information about traffic and weather conditions, and schedule of events in a particular area.

Examples of Operations of the Ad-Hoc Energy Exchange Network

Figure 7:
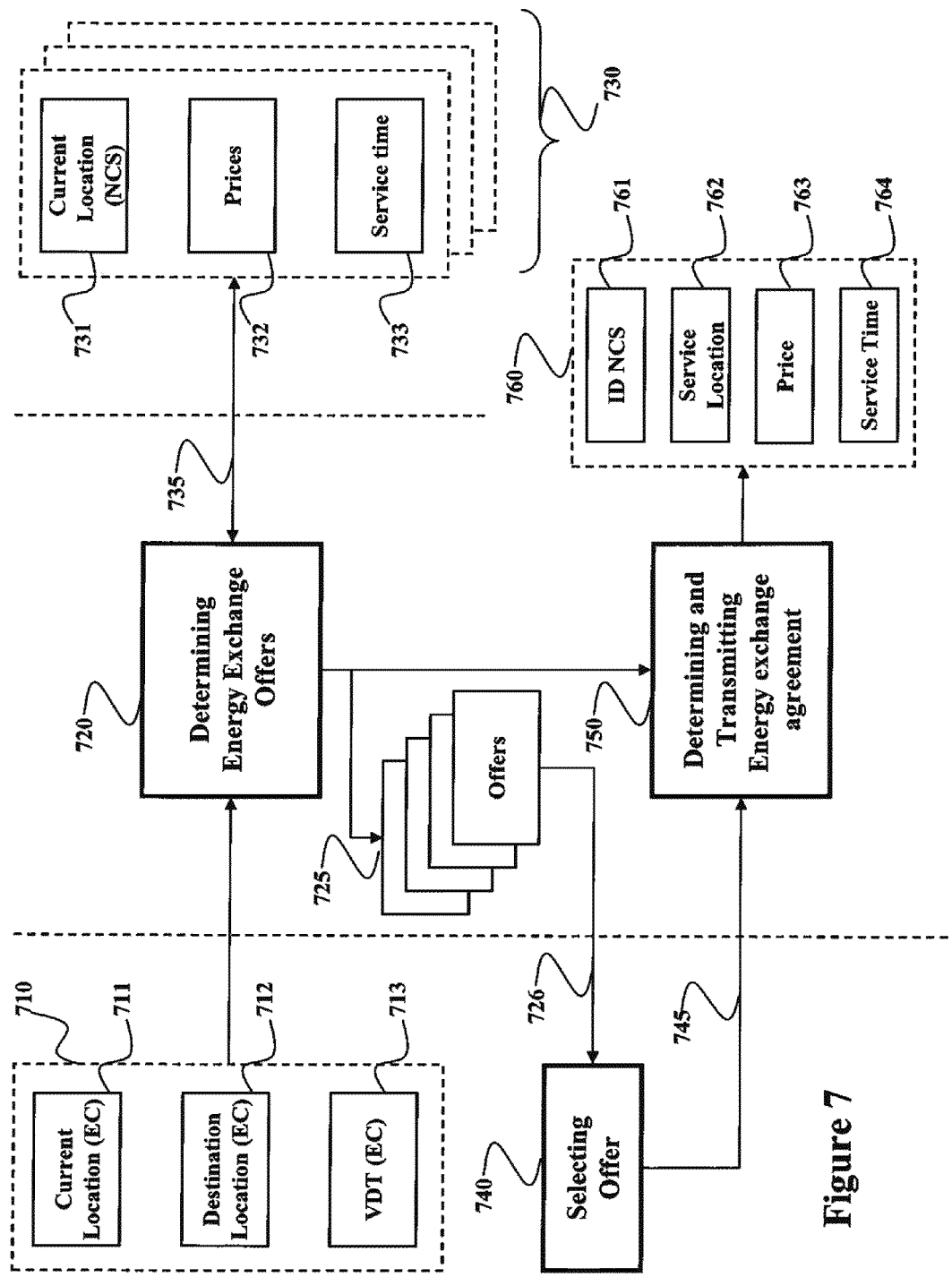
FIGS. 7 and 8 are block diagrams of a method for facilitating an operation of an energy exchange ad-hoc network.

FIG. 7 shows a method for facilitating an operation of the ad-hoc energy exchange network, which includes multiple nomadic charging stations (NCSs). The steps of the method are performed by a processor. For clarity, the method is described from a point of view of the operation center, and the processor is the processor 201 of the operation center. However, the steps of the method can be executed by the processor 202 of the NCS, as described in more details below.

The operation center receives a request 710 from the energy consumer for an energy exchange. The request can include a current location 711 of the EC and a destination location 712 of the energy consumer. Typically, the locations are identified by coordinates provided by the location unit, e.g., coordinates received from the GPS. The request can also include the VDT 713 of the energy consumer, e.g., the VDT is determined based on the energy remained in the batteries of the energy consumer.

Based on the request, the operating system determines 720 an agreement for the energy exchange 760. The agreement includes a service location 762 for performing an energy exchange between a nomadic charging station (NCS) and the energy consumer. In various embodiments, the agreement also includes ID of the NCS 761, the price 763 of the unit of energy, and service time 764. The agreement is determined 750 based on the current location of the EC, the destination location of the EC, and a current location of the NCS.

In one embodiment, the operation center determines the agreement. For example, the operation center selects the NCS closest to a route of EC identified by the current and destination locations. Additionally or alternatively, the operation center determines the exchange location and the NCS, such that the service time is minimized.

In another embodiment, the operation center determines or receives a set of offers 725 for the energy exchange from a set of NCS 730. For example, in one embodiment, the operation center transmits 735 the request 710 to the NCSs and receives the set of offers 725 from the NCS. In one embodiment, the operation center transmits the request to all NCSs in the set 730. In another embodiment, the operation center transmits the request to NCSs having current location near to the route of the energy consumer, e.g., within two miles from the route.

The set of offers is transmitted 726 to the energy consumer. The energy consumer selects 740 the offer from the set, and transmits 745 information, indicative of a selection of the offer, to the operation center. Details of the selected offer forms the agreement 760 communicated to both the NCS and the EC.

In various embodiments, the service location can differ from the current location of the NCS and the current location of the EC, and the operation center requests the NCS and the EC to relocate to the service location for the energy exchange.

Figure 8:
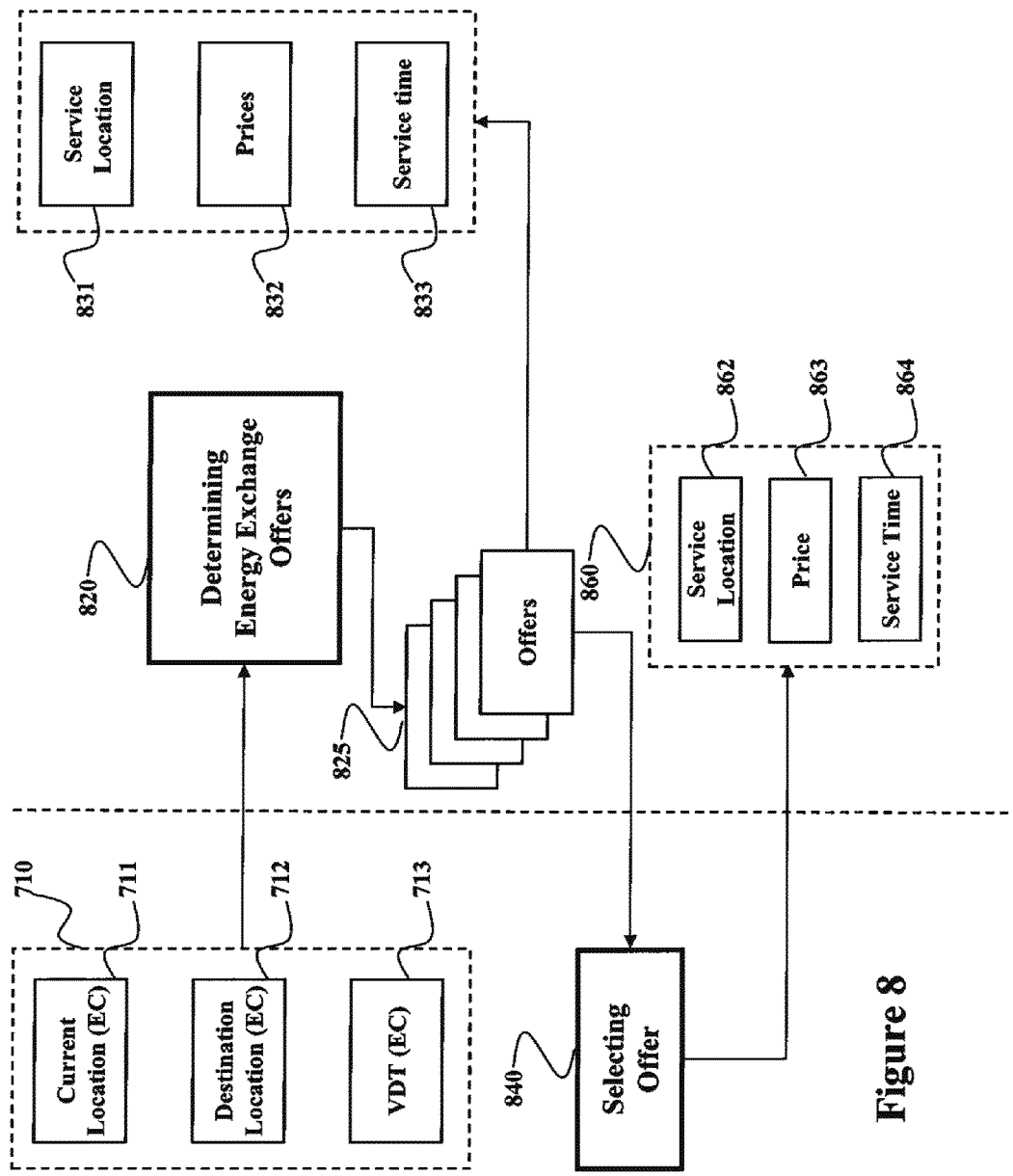

Each NCS can provide one or several offers. FIG. 8 shows a method for determining the agreement for the energy exchange between the NCS and the energy consumer, according another embodiment of the invention. The request 710 is received by the NCS from the operation center, or directly from the energy consumer. The NCS determines 820 a set of offers 825. Each offer includes a service location 831 and a price for the unit of energy. The offer can also include a service time 833 and other information useful for the energy exchange described above, e.g., amount of energy available for sale. The price 832 can be the same for all offers, or different for some or each service location. For example, the price can vary due to time the NCS has to travel for that proposed service location. In one embodiment, each offer includes a unique combination of the service location and the price. The energy consumer selects 840 the offer that forms the agreement 860 for the energy exchange between the energy consumer and the NCS. The agreement 860 includes one or combination of the service location 862, the price 863 for the unit of energy, and the service time 864.

Optimal Energy Supplier Placement Principle

An optimal energy supplier placement principle is described below. Consider N ECs capable of one-dimensional movement with [0, $D_{max}$] as the beginning and end points. Let $\Omega_i$ denote a set of points x that the EC i traverses without draining and recharging its battery. A reward function $\Delta(x^{(i)})$ for point x regarding EC i is:

$$\Delta(x^{(i)}) = \begin{cases} 1 & \text{if } x \in \Omega_i \\ 0 & \text{otherwise.} \end{cases}$$

Then, the total reward of point x is $$\Delta(x) = \sum_{i=1}^{N} \Delta(x^{(i)}), \forall x \in [0, D_{max}].$$

The optimum point $x_{opt}$ for deploying a single NCS is the point that has the maximum total reward.

$$x_{opt} = \underset{x}{\operatorname{argmax}} \, \Delta(x).$$

It is possible that multiple points can have the same total reward. In this case, the NCS can be located at any of those points. In the case of multiple local maximums, NCSs are deployed on an order of high to low rewards.

Using the insight for the one-dimensional case, the analysis can be extended to two dimensional for which the new reward function is $$\Delta(x^{(i)}, y^{(i)}) = \begin{cases} 1 & \text{if } (x, y) \in \Omega_i \\ 0 & \text{otherwise,} \end{cases}$$

where $\Omega_i$ denotes the set of coordinates along the route of EC i that EC i passes without a need to recharge its battery. Then, the total reward for coordinates (x, y),
$\forall x \in [0, D_{x_{max}}], \forall y \in [0, D_{y_{max}}]$ is $$\Delta(x, y) = \sum_{i=1}^{N} \Delta(x^{(i)}, y^{(i)}),$$

where $[0, D_{x_{max}}]$ and $[0, D_{y_{max}}]$ denote the service boundaries in the x and y dimensions, respectively.

The optimum coordinates ($x_{opt}$, $y_{opt}$) for deploying a single NCS are the coordinates with the maximum total reward.

$$(x_{opt}, y_{opt}) = \underset{(x,y)}{\mathrm{argmax}}\ \Delta(x, y).$$

Constraints

Sometimes, the ECs can travel to the NCS. In this case, the placement of the NCSs can be optimized by considering the following constraints.

Assume that EC i starts a trip at a constant velocity $V_i$ with initial energy level $e_i$ between two points A and B, which are separated by $r_{AB}$, and also that energy consumption per unit distance traversed is $k_i$. If $e_i < k_i r_{AB}$, then recharging during the trip of the EC i is needed to prevent energy outage.

One embodiment models the physical distance tolerance (PDT) as a function of the time and the distance that can be traversed by an EC without recharging its battery. The PDT can be determined according to $$T_p^{(i)}(t) \equiv \max\left(0, \frac{e_i}{k_i} - v_i(t)t\right).$$

Figure 9:
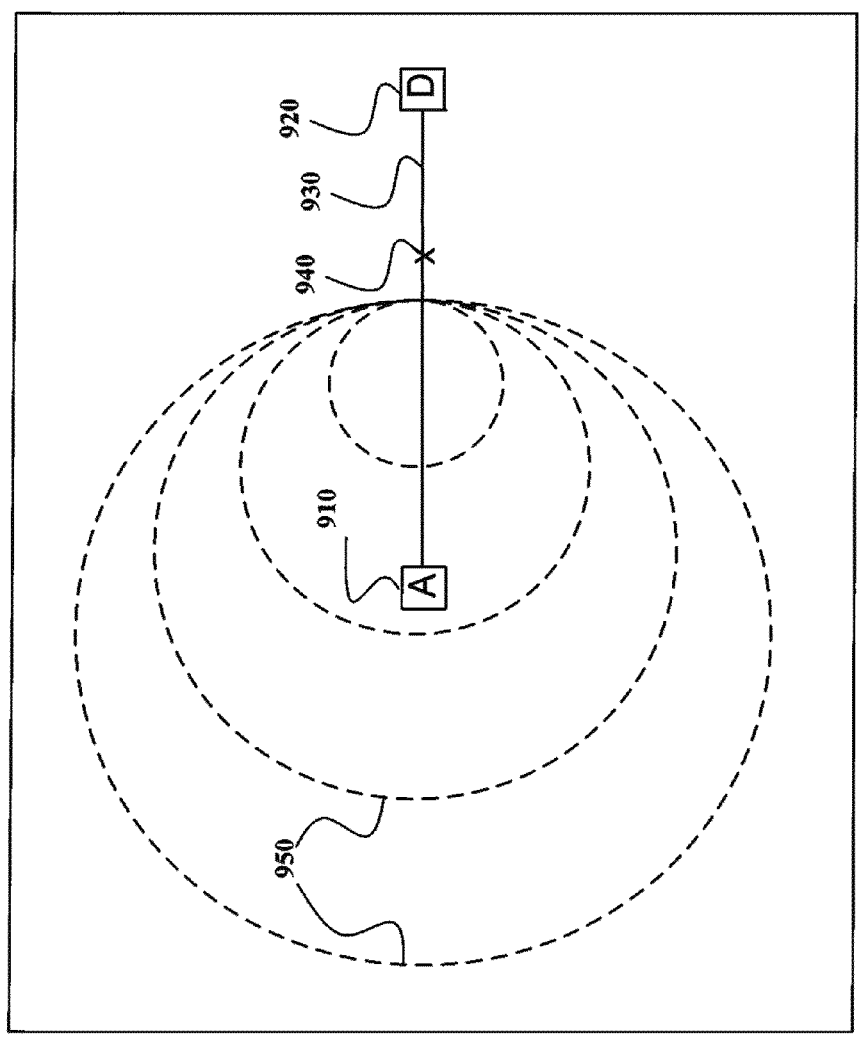
FIG. 9 is a schematic of physical distance tolerance circles according to embodiments of the invention.

The PDT 950 decreases as the EC moves along the travel route 930 from the current location 910 to the destination 920, and becomes zero 940 when the battery is empty, as shown in FIG. 9. The EC i can deviate for a certain distance from its original route to recharge the battery. Maximum possible deviation at a given time is defined as the virtual distance tolerance (VDT), and denoted by $T_v^{(i)}(t)$.

The VDT $T_v^{(i)}(t)$ can be determined according to $$T_v^{(i)}(t) = \max(0, e^{-\lambda_i t}(r_{AB} - v_i(t)t)),$$

where $\lambda$, is a deviation decay constant to determine the envelope of the VDT circles. A hard constraint on VDT tends to increase energy outages. Such ECs can empty their batteries before reaching a NCS within their VDT circle. The VDT is less or equal than PDT for the EC.

Energy inefficiency (EI), $E_i$, of an EC i is defined as the energy consumption overhead due to a deviation from the route. The EI is upper bounded by $2T_v^{(i)}(T_0)/r_{AB}$, where $T_0$ indicates the time instant the deviation takes place. The factor of two is due to round-trip deviation. In situations when an EC cannot move to a NCS due to any PDT or VDT constraint, the NCS moves to the EC to charge the EC. Early charging is better to minimize energy outage, because the feasible region of an EC determined by the VDT and PDT deceases in time.

This introduces another factor called a supplier virtual distance tolerance (SVDT), $T_v^{(s)}(t)$. The SVDT indicates how far the NCS can relocate to charge an EC. Some embodiments of the invention use an incentive mechanism to encourage NCS to move towards the EC and for the EC to increase its VDT.

Energy Incentive Model

In one embodiment, the distance d between the EC that wants to buy $E_B^{(0)}$ amount of energy and the NCS is much longer than the VDTs of both the EC and the NCS. In this case, if the EC is not recharged, then an energy outage occurs. To prevent the outage, incentives are provided to both the NCS and the EC to promote their relocation towards each other.

In one embodiment, the price of unit energy $C_e$ is increased by $\alpha_s$ for every unit distance the NCS moves to the consumer EC. Additionally or alternatively, the price of unit energy is reduced by $\alpha_b$ for every unit distance the EC moves to the NCS.

The resulting revenue G for the NCS is determined according to $$G(x^*) = (E_B^{(0)} + x^* k_i) C_e \left(1 + \frac{-\alpha_b x^* + \alpha_s(d - x^*)}{d}\right)$$

where x*[0, d] denote the location at which the EC and NCS agree to meet for energy transaction, and $k_i$ is the energy consumption per unit distance for the energy consumer. The provider consumes energy during relocating itself. The cost of this energy is given by $$S_c(x^*) = (d - x^*) k_s C_s,$$

where $C_s$ the price of unit energy the provider pays for, and $k_s$ is the energy consumption per unit distance for the provider. At a given meeting point $x^\circ$, the difference of movement costs for the provider and consumer is called the relative cost, given by $$\Delta S(x^*) = G(x^*) - E_B^{(0)} C_s - S_c(x^*)$$

A service location that results in equal cost to the provider and consumer is defined a zero-relative-cost location.

In the case of multiple energy consumers, the NCS can jointly consider the incentives that the consumers can settle for a meeting point. Let $\Omega_V$ with cardinality V denote the entire set of consumer ECs that require energy from a portable charging station v. The coordinates of EC i are $r_i = [x_i, y_i]$ for i=1, 2, ..., V and that of NCS s by $r_s = [x_s, y_s]$.

Some embodiments consider a zero-relative-cost meeting coordinate denoted by $r_{mp}(f) \in \Re^2$. For example, any service location equidistant from both the supplier and the consumer is a zero-relative-cost location. In a two dimensional Euclidian space, the set of the zero-relative-cost locations form a line that is orthogonal to the shortest distance line between the energy provider and the energy consumer. The line segments that fall outside the PDT circle of the consumer are infeasible, because the consumer does not have sufficient energy to travel to those locations.

One embodiment determines a globally zero-relative cost exchange location. In this embodiment, the NCS first determines the feasible zero-relative-cost line segment with each energy consumer, and then searches for the intersection of all those segments. Let $\Omega_F$ with cardinality F denote a set of meeting point coordinates $r_{mp}(f)$ for f=1, 2, ..., F, such that at least two feasible segments intersect each point. Also, let $\Omega_I^{(f)}$ and $P_I(f)$ denote a set of consumers to be served at location $r_{mp}(f)$, and the corresponding profit to be generated for the provider, respectively. One embodiment selects the service location that maximizes the profit for NCS according to $$r_{mp}(f^*) = \underset{f \in \Omega_F}{\mathrm{argmax}} \frac{(G(r_{mp}(f)) - S_c(r_{mp}(f)))}{P_I(f)}$$

where $$G(r_{mp}(f)) = \sum_{i \in \Omega_I^{(f)}} (E_B^{(i)} + \|r_{mp}(f) - r_i(f)\| k_i)$$

$$C_e \left(1 + \frac{-\alpha_b \|r_{mp}(f) - r_i(f)\| + \alpha_s \|r_{mp}(f) - r_s(f)\|}{\|r_{mp}(f) - r_i(f)\| + \|r_{mp}(f) - r_s(f)\|}\right)$$

and $$S_c(r_{mp}(f)) = \|r_{mp}(f) - r_s(f)\| k_s C_s.$$

When feasible segments do not intersect, one embodiment is configure to vary $\alpha_b$ and $\alpha_s$, which would move the feasible segment to the left or right of the segment defined for $\alpha_b=\alpha_s$. In selecting the service location, other criteria can include minimizing the number of ECs that have an energy outage; minimizing overall trip duration or distance to be traversed by the NCS; minimizing energy cost for the consumer ECs.

Examples of Searching Methods

Small-Radius-First

The EC that needs to recharge starts to search with an initial radius r. If the EC cannot locate any energy provider that can provide enough energy, then the EC searches again with an increment on the searching radius. However, the maximum searching radius should be within the waiting delay tolerance of the energy supplier. If the remaining energy is less than the searching radius, then the EC uses the remaining energy as the searching radius. During small-radius-first searching method, the searching radius starts from a relative small value r, then increase to a larger r, and then when the energy is consumed, the searching decreases again.

Large-Radius-First

The EC starts to search with the initial energy tolerance as the initial searching radius. If the EC cannot find any energy provider that can provide enough energy, then the EC searches again with the current energy tolerance as the searching radius. The maximum searching radius is also within the energy supplier tolerance.

In this process, the searching radius starts from a large value which is the initial energy tolerance, and then as energy is consumed, the searching radius decreases.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for facilitating an operation of an ad-hoc energy exchange network, the network includes a set of nomadic charging stations (NCSs), wherein steps of the method are performed by a processor, comprising steps of:
   receiving a request from an energy consumer (EC) for an energy exchange, the request includes a current location of the EC and a destination location of the EC;
   determining an exchange location for performing the energy exchange between a nomadic charging station (NCS) and the EC based on the current location of the EC, the destination location of the EC, and a current location of the NCS; and
   transmitting the exchange location to the NCS and the EC.

2. The method of claim 1, wherein the exchange location differs from the current location of the NCS and the current location of the EC, further comprising:
   requesting the NCS and the EC to move to the exchange location.

3. The method of claim 1, further comprising:
   determining a set of offers, each offer includes the exchange location and a price for a unit of energy; and
   determining the exchange location based on a selection of an offer by the energy consumer.

4. The method of claim 1, further comprising:
   transmitting to the EC a set of offers for the energy exchange, each offer includes a proposed service location; and
   determining the service location based on a selection of an offer by the EC.

5. The method of claim 4, wherein each offer includes a price for a unit of energy and a service time of the energy exchange.

6. The method of claim 4, wherein the set of offers includes offers from the set of NCSs.

7. The method of claim 4, wherein the set of offers includes offers only from the NCS.

8. The method of claim 1, further comprising:
   determining locations of a set of nomadic charging stations (NCSs) according to an optimal energy supplier placement principle.

9. A nomadic charging station (NCS) for facilitating an operation of an ad-hoc energy exchange network, wherein an energy exchange is performed at an exchange location, and wherein the NCS moves from a current location to the exchange location, comprising:
   a communication unit for receiving a request from an energy consumer (EC) for the energy exchange, the request includes a current location of the EC and a destination location of the EC;
   a location unit for determining a set of exchange locations for the energy exchange based on the current location of the EC, the destination location of the EC, and the current location of the NCS; and
   a pricing unit for determining a price of a unit of energy at each exchange location.

10. The NCS of claim 9, further comprising:
    a service delay calculator unit for determining a service time at each exchange location.

11. The NCS of claim 9, further comprising:
    a battery unit for determining an amount of the energy available for the energy exchange.

12. The NCS of claim 9, wherein the NCS is portable charging station or mobile charging station.

13. The NCS of claim 9, wherein the set of exchange locations includes a zero-relative-cost location.

14. A method for facilitating an energy exchange between a nomadic charging station (NCS) and an energy consumer (EC), wherein steps of the method are performed by a processor of the EC, comprising steps of:
    transmitting a request for the energy exchange, the request includes a current location of the EC and a destination location of the EC, and a virtual distance tolerance (VDT) of the EC;
    receiving, in response to the transmitting, an offer for the energy exchange, the offer includes an exchange location, and a price for a unit of energy; and
    transmitting information indicative of a selection of the offer.

15. The method of claim 13, wherein the offer further includes a time of the energy exchange at the exchange location.

16. The method of claim 13, further comprising:
    receiving a plurality of offers for the energy exchange from the NCS, each offer includes a unique combination of the service location and the price of the unit of energy.

* * * * *